United States Patent [19]

Smoot

[11] Patent Number: 5,480,268

[45] Date of Patent: Jan. 2, 1996

[54] ROTARY AIRLOCK FEEDER WITH LOW PRESSURE PURGE SYSTEM

[75] Inventor: David K. Smoot, Overland Park, Kans.

[73] Assignee: Smoot Company, Kansas City, Kans.

[21] Appl. No.: 437,520

[22] Filed: May 9, 1995

Related U.S. Application Data

[63] Continuation of Ser. No. 73,335, Jun. 7, 1993, abandoned.

[51] Int. Cl.⁶ .............................. B65G 53/66; B65G 53/46
[52] U.S. Cl. .............................. 406/30; 406/65; 222/368; 222/636
[58] Field of Search .................................. 406/10, 11, 29, 406/30, 34, 46, 63, 65, 67; 222/368, 630, 636

[56] References Cited

U.S. PATENT DOCUMENTS

| | | | |
|---|---|---|---|
| 2,477,414 | 7/1949 | McBride | 406/65 |
| 2,750,233 | 6/1956 | Yellott | 406/67 |
| 3,085,831 | 4/1963 | Mylting | 406/65 |
| 3,151,784 | 10/1964 | Tailor | 222/368 |
| 3,206,254 | 9/1965 | Mylting | 406/65 |
| 3,273,758 | 9/1966 | Starrett | 222/636 |
| 3,291,536 | 12/1966 | Smoot | 406/30 X |
| 3,554,608 | 1/1971 | Farnworth et al. | 406/65 |

Primary Examiner—Andrew C. Pike
Attorney, Agent, or Firm—Litman, McMahon and Brown

[57] ABSTRACT

A rotary airlock feeder is connected to transfer particulate material between a storage bin and a pneumatic convey line. The pneumatic convey line includes a pressure reducing orifice plate which produces a pressure differential in the convey line between the upstream and downstream sides of the orifice plate. Air from the upstream side flows into respective specially designed end plates of the feeder and the pressure differential between opposite sides of the orifice assures a steady purge air flow circumferentially around a pair of rotary shrouds and into the feeder. This steady air flow prevents particulate material or debris from entering cavities between the shrouds and the end plates and between the rotary shrouds and the housing walls and thus prevents such material from reaching the seals, shaft area, and bearings of the feeder and protects the rotary shrouds from premature abrasive wear. The end plates can include machined annular recesses which are designed to introduce and equalize the purge air flow about the rotary shrouds.

11 Claims, 2 Drawing Sheets

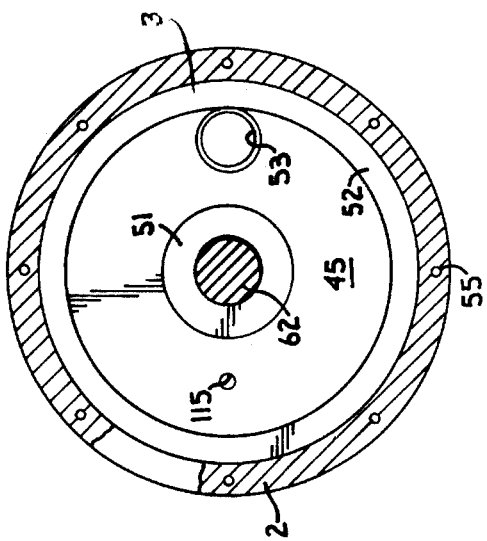
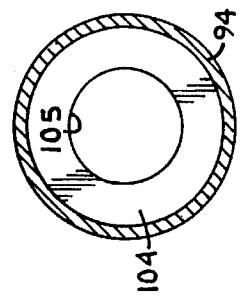
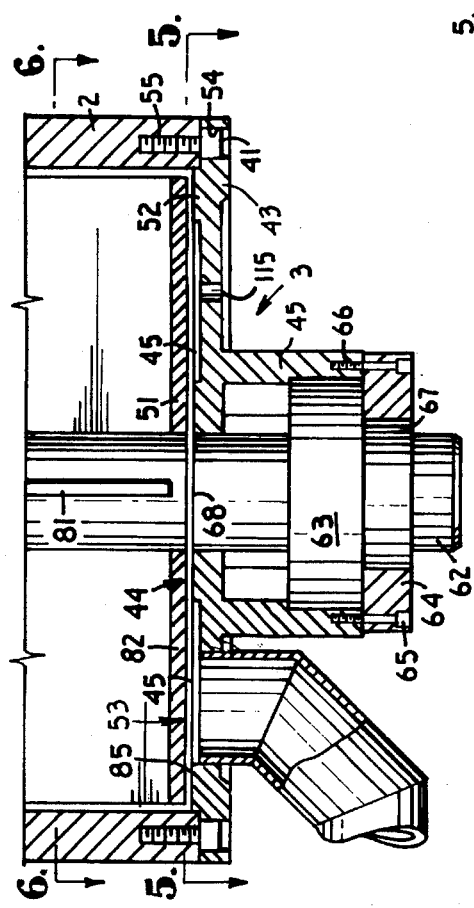
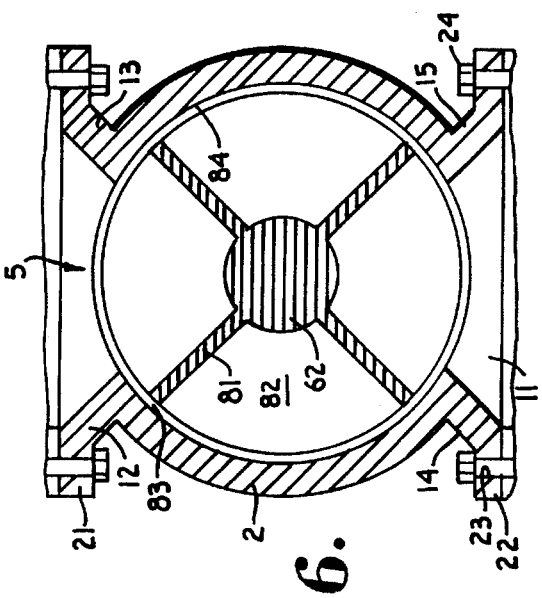

5,480,268

ROTARY AIRLOCK FEEDER WITH LOW PRESSURE PURGE SYSTEM

This application is a continuation of application Ser. No. 08/073,335 filed Jun. 7,1993, now abandoned.

BACKGROUND OF THE INVENTION

The present invention relates to a rotary airlock feeder for transferring particulate material from a storage chamber to a pneumatic convey line, and more particularly to such a feeder equipped with a low pressure air purge for preventing particulate material, dust, and debris from entering the bearings, seals, and critical moving parts of the feeder.

Rotary airlock feeders are commonly used in situations where particulate material must be transferred between a storage chamber, such as a hopper, and a pneumatic conveyor. A typical rotary airlock feeder includes a generally cylindrical housing connected transversely between the bottom of the storage chamber and the conveyor. Within the airlock feeder, a rotary shaft extends longitudinally through the cylindrical housing, supported on either end by a respective bearing positioned in a corresponding fixed end plate. A number of radially extending blades are attached to and extend outward from and run parallel to the shaft. A pair of rotary shrouds are also attached to the shaft, extending concentrically outward therefrom and perpendicular thereto, with the rotary shrouds abutting the blades, one shroud on either end. The rotary shrouds are positioned just inside of respective ones of the fixed end plates, allowing just enough of a cavity therebetween to permit free rotation of the rotary shrouds. The blades collectively form a number of annular wedge shaped spaces closed at either end by the rotary shrouds, which spaces rotate with the shaft. As the shaft is rotated, material is fed via these rotating wedge-shaped spaces from the top of the feeder to the bottom of the feeder and thence into the convey line. The rotating blades and the rotary shrouds act as an airlock to prevent pressurized air from being fed from the convey line directly into the storage chamber, which would disrupt the material flow into the convey line and disrupt air and material flow through the convey line itself.

While such rotary airlock feeders have been relatively successful in promoting the smooth flow of particulate material into pneumatic convey lines, they are subject to frequent maintenance and downtime for cleaning due to dust and debris from the particulate material entering the bearings, seals and other critical moving parts and clogging the cavities between the fixed and rotary shrouds. Also, due to very close machining tolerances between the rotating shrouds and the walls of the cylindrical housing, particulate material entering the gap between the shrouds and the housing walls causes rapid abrasive wear on both the shroud peripheries and the cylinder walls themselves.

Prior art attempts have been made to prevent particulate material, dust and debris from clogging airlock feeders. Often a flexible annular seal extends between each rotary shroud and the corresponding fixed end plate to prevent debris from entering the cavities between the fixed and rotary shrouds and to prevent the material from collecting in the gaps between the rotary shrouds and the cylindrical housing walls. However, these flexible seals repeatedly, temporarily fail as the shaft rotates, due to vibration of the feeder. Thus, minute quantities of debris repeatedly enter the cavities between the end plates, eventually migrating outward along the shaft and clogging the bearings, seals and the shaft itself, as well as eroding the rotary shroud peripheries and housing walls.

One common technique of preventing such repeated ingress of debris across the seals, as reflected by U.S. Pat. No. 3,151,784 to Tailor, is to introduce a gas under relatively high pressure into the fixed end plates about the periphery of the rotary shaft just inside the support bearings. This causes a pressure differential to exist between the shaft and the interior of the feeder. This pressure differential between the shaft and the airlock feeder interior theoretically forces the seal outward and keeps debris from entering the end plate spaces and clogging the shaft and bearings.

In practice, the volume of high pressure air generally used to pressurize the shafts, in systems such as the Tailor patent, is insufficient to purge the cavities between the fixed and the rotary shrouds or to prevent material from entering the gap between the rotary shrouds and the cylindrical housing. This can allow dust, debris and small particles of the particulate material to enter these cavities, eventually clogging the cavities and requiring the feeder to be frequently stopped and cleaned. Repeated migration of such material into the working components of such feeders can drastically reduce the useful life of the feeders. Furthermore, such systems require a dedicated source of high pressure air or gas in addition to the low pressure source used in the pneumatic conveyor. This can be a costly solution, particularly where it is desired to supply a sufficient volume of high pressure air to successfully purge the end plate cavities as well.

Accordingly, a need still exists for a simple and reliable system for preventing dust and debris or particulate material from clogging the shaft, seals, and bearings of a rotary airlock feeder as well as causing premature abrasive wear of the periperies of the rotary shrouds and housing walls. Such a system should also preferably prevent such debris from entering the cavities between the fixed and rotary shrouds in the feeder. In addition, the system should not require a costly and dedicated source of high pressure air separate from the pneumatic convey line air source.

SUMMARY OF THE INVENTION

The present invention is directed to a rotary airlock feeder with a low pressure air purge system. The feeder includes a pair of specially shaped fixed end plates which each incorporate an inward facing annular recess. The annular recesses are thus positioned within the cavities between the fixed end plates and a corresponding pair of rotary shrouds. A high volume source of low pressure air is introduced through a purge air opening extending through the ends of each fixed end plate and into the corresponding annular recess. Each annular recess is concentrically positioned between an inner and an outer raised circular portion of the end plate. Thus, purge air introduced directly into the annular recesses is equally distributed about the recess, creating a constant flow of pressurized air outward from the end plate in all directions. This purge air flows circumferentially around the rotary shrouds, preventing particulate material or debris from entering the gaps between the rotary shrouds and the cylindrical housing walls or the cavity between the rotary shrouds and the fixed end plates. A connected pneumatic convey line is used as the source for the low pressure purge air. A pressure reducing orifice plate is positioned in the convey line to provide a pressure differential between the upstream and the downstream sides of the orifice plate. Purge air is drawn from the upstream side and the pressure differential causes the purge air to continuously flow around the rotary shrouds to purge the feeder.

OBJECTS AND ADVANTAGES OF THE INVENTION

The principal objects of the present invention include: to provide an improved rotary airlock feeder; to provide such a feeder with an improved low pressure purge system; to provide such a feeder with specially designed fixed end plates incorporating inward facing annular grooves; to provide such a feeder in which a high volume of relatively low pressure purge air is introduced into each of the annular grooves; to provide such a feeder in which the low pressure purge air is evenly distributed about the fixed end plates due to the annular recess; to provide such a feeder in which the evenly distributed purge air flows circumferentially around corresponding rotary shrouds attached to the rotary feeder shaft, thus preventing debris from entering cavities between the fixed end plates and the corresponding rotary shrouds; to provide such a feeder in which the purge air is drawn directly from a connected pneumatic convey line; to provide such a feeder in which a special orifice is placed within the convey line to provide a pressure drop below the point at which the purge air is drawn from the convey line; to provide such a feeder in which the pressure differential across the special orifice is sufficient to assure the even flow of purge air about the rotary shrouds; to provide such a feeder in which purging is accomplished by the use of readily available low pressure air from the pneumatic convey line, thus obviating the need for a costly, dedicated high pressure purge air source; and to provide such a feeder which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is an enlarged cross-sectional view of the feeder, taken along line 4—4 of FIG. 3, and illustrating the specially designed fixed end plate with an annular purge recess.

FIG. 5 is an enlarged, cross-sectional view of the feeder, taken along line 5—5 of FIG. 4, and further illustrating the fixed end plate construction.

FIG. 6 is an enlarged, cross-sectional view of the feeder, taken along line 6—6 of FIG. 4, and illustrating the interior feeder construction including the blades and one of the rotary shrouds attached to a central shaft.

FIG. 7 is an enlarged, cross-sectional view of the convey line, taken along line 7—7 of FIG. 3, and illustrating the differential pressure generating orifice plate positioned therein.

DETAILED DESCRIPTION OF THE INVENTION

Figure 1:
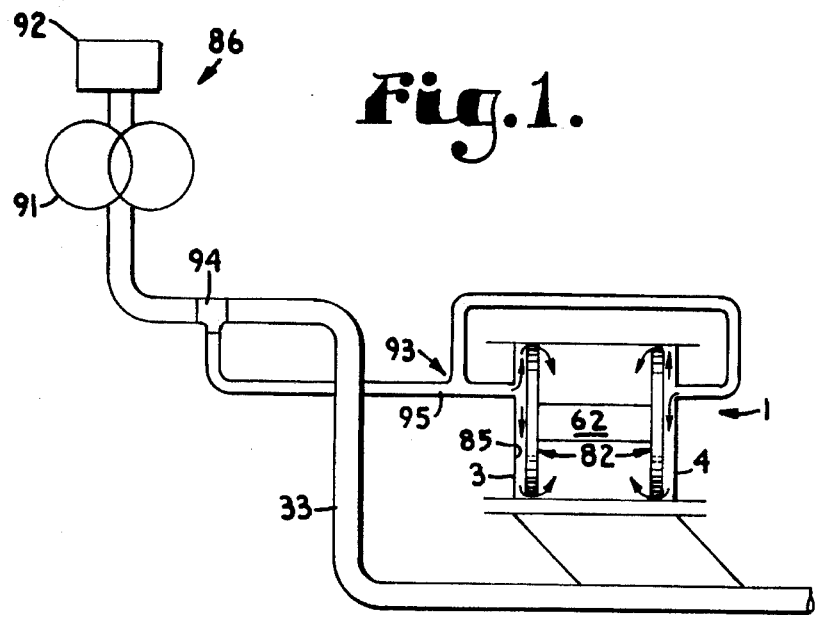
FIG. 1 is a schematic view of a rotary airlock feeder supplying particulate material to a specially adapted pneumatic convey line and drawing low pressure purge air from the convey line.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

ROTARY AIRLOCK FEEDER

Referring to FIGS. 1–6, the reference numeral 1 generally designates a rotary airlock feeder in accordance with the present invention. The feeder 1 includes a generally cylindrical housing 2, to which a pair of fixed end plates 3 and 4 are attached. An ingress opening 5 is provided at the top of the housing 2 and an egress opening 11 is provided at the bottom thereof. A pair of angled wall portions 12 and 13 (FIG. 6) funnel particulate material into the ingress opening 5 and a similar pair of angled wall portions 14 and 15 direct the material outward from the egress opening 11.

Figure 3:
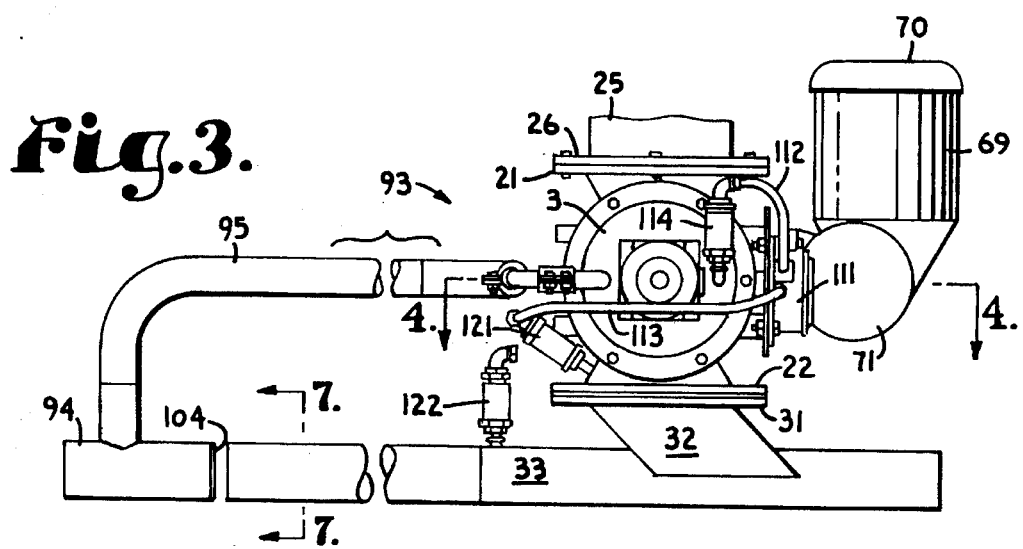
FIG. 3 is an enlarged side elevational view of the rotary airlock feeder and a portion of the pneumatic convey line.

A first rectangularly shaped flange 21 surrounds the ingress opening 5 and a second rectangularly shaped flange 22 surrounds the egress opening 11. The flanges 21 and 22 have a plurality of bores 23 extending therethrough to accommodate bolts 24. The flange 21 is thus attachable to a material storage hopper 25 via a mating flange 26, a portion of which is shown in FIG. 3, and the flange 22 is attachable to a mating flange 31 on a discharge adaptor 32 which leads to a pneumatic convey line 33.

The pair of fixed end plates 3 and 4 are attached to opposite ends of the housing 2 via a plurality of bolts 41. The end plate 3 is illustrated in detail in FIGS. 4 and 5, it being understood that the opposite end plate 4 is a mirror image thereof.

The end plate 3 comprises a cylindrical bearing and shaft support extension 42 attached to a solid disc section 43. The disc 43 is machined or otherwise shaped on an inward facing side 44 to include an annular recess 45. The annular recess 45 is thus recessed from, positioned between, and concentric with an inner annular ring 51 and an outer annular ring 52. A relatively large diameter purge air opening 53 extends through the end plate 3 within the recess 45. A plurality of bores 54 are provided to accommodate a like plurality of the threaded bolts 41 to attach the end plate 3 to the housing 2, which includes matching threaded bores 55.

A rotary shaft 62 extends through the extension 42 and longitudinally through the cylindrical housing 2. A bearing 63 supports the shaft 62 within the extension 42. An end cap 64 is bolted to the extension 42 via a plurality of bolts 65 extending into threaded bores 66. A seal 67 is positioned within the end cap 64 surrounding the shaft 62 to prevent air leakage through the end cap 64 around the shaft 62. A seal 68 is positioned within the end plate 43 to prevent air leakage through the plate 43.

Figure 2:
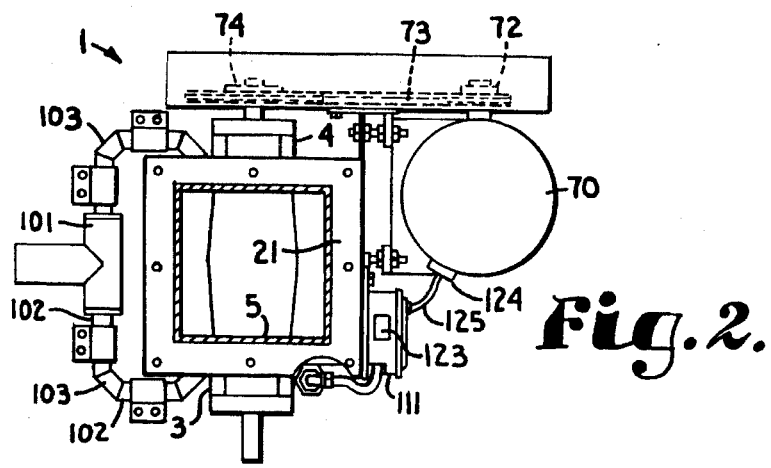
FIG. 2 is an enlarged top plan view of the rotary airlock feeder, with a drive belt illustrated in phantom lines.

An electric drive motor 69 is provided with a dust proof cap 70 to keep dust and debris from entering the motor housing. The motor 69 is connected to a gear housing 71 to drive a drive sprocket 72. A drive chain 73, shown in phantom lines in FIG. 2, is connected between the sprocket 72 and a sprocket 74 attached to the rotary shaft 62 to drive the feeder 1.

Referring to FIG. 6, the shaft 62 is illustrated with a plurality of radially extending blades 81 welded or otherwise attached to and extending outward from the shaft 62, with each blade 81 extending parallel to the shaft 62. A pair of circular rotary shrouds 82 are also welded or otherwise attached to and extending radially outward from the shaft 62. The shrouds 82 are attached to respective ends of the blades 81 and are concentric with the shaft 62. The blades 81 are machined to an extremely close tolerance, allowing a clearance of 0.004–0.006 inch in a gap 83 between the blades 81 and an inner wall surface 84 of the cylindrical housing 2. This prevents particulate material from migrating between the blades 81 and the housing wall 84. The same close tolerances exist in the gap 83 between the rotary shrouds 82 and the wall surface 84. The recess 45 extends between each of the end plates 3 and 4 and the corresponding shroud 82, as shown in FIG. 4.

PNEUMATIC CONVEY AIR LINE AND LOW PRESSURE PURGE SYSTEM

The pneumatic convey line 33 is connected to the discharge adaptor 32 to convey away particulate material exiting the airlock feeder 1. A compressed air supply system 86, which can include an air compressor 91 and an inlet filter 92, shown schematically in FIG. 1, is attached to the convey line 33. In a conventional fashion, the convey line 33 acts as a pressure pneumatic conveyor, with an air stream from the air supply system 86 moving through the line 33 under pressure and conveying away particulate material, which moves to the right, as illustrated in FIGS. 1 and 3. A low pressure purge system 93 includes a Tee connector 94 connected into the line 33, with a purge air supply line 95 connected to the top of the Tee connector 94. Pressurized air from the line 33 enters the line 95 and is conducted to a second Tee connector 101 (FIG. 2). The Tee connector 101 splits the purge air stream into two components which flow through a split path including a matched series of straight pipe sections 102 and elbows 103 to enter the end plates 3 and 4 at the purge air openings 53.

An orifice plate 104, shown in detail in FIG. 7, is welded or otherwise securely fastened within the outlet end of the T connector 94. The orifice plate 104 includes a central orifice 105 which is of a reduced size from the inside diameter of the line 33. The orifice 105 may be concentric with the line 33. The effect of the reduced size orifice 105 is to cause a pressure differential within the line 33 between the upstream and the downstream sides of the orifice plate 104. This insures that the air flowing through the purge air supply line 95 is at a slightly elevated pressure from the air flowing past the discharge adaptor 32. For example, the pressure differential may be approximately 0.5 psig.

Referring to FIGS. 1 and 5, the purge air streams enter the feeder 1 through the purge air openings 53 in the annular recesses 45. The purge air is distributed evenly about the annular recesses 45, creating equal pressure about the circumference of the end plates 3 and 4 at the confluence between the end plates 3 and 4 and the corresponding shrouds 82. Thus, the purge air, due to the pressure differential between the purge air line 95 and the convey line 33, caused by the orifice plate 104, flows continuously about the end plates 3 and 4 and circumferentially around the shrouds 82, as illustrated by the flow arrows in FIG. 1. This constant flow of purge air keeps material, dust, and debris from entering the cavities 85 between the shrouds 82 and the corresponding end plates 3 and 4. This eliminates the need for a conventional, unreliable rotary seal between the shrouds 82 and the inner wall surface 84. Thus, material is prevented from reaching the shaft 62, the seals 67 and 68, and the bearings 63, or entering the gap 83 between the rotary shrouds 82 and the inner wall surface 84 of the cylindrical housing, thus greatly extending the life of and reducing the maintenance required on the feeder 1.

Referring to FIGS. 2 and 3, a differential pressure gauge 111 is connected to one end of each of a pair of hoses 112 and 113. The other end of the hose 112 is connected to a first differential gauge filter 114 which is attached to the end plate 3 through a dedicated aperture 115 (FIG. 5). The other end of the hose 113 is connected to a second differential gauge filter 121 which is connected to the feeder discharge adapter 32. The filter 114 thus inputs air pressure from the high pressure or purge air side of the feeder 1 while the filter 121 inputs air pressure from the low pressure or convey line side of the feeder 1. An alternative location for low pressure sensing is an attachment directly to the convey line 33, as demonstrated by the unconnected filter 122 in FIG. 3.

The differential pressure gauge 111 senses the pressure differential between the high and low pressure sides of the feeder 1 and gives a reading and/or an alarm on a gauge 123 should the pressure differential be too low for effective purging action. Alternatively, the differential pressure gauge 111 can be connected to a switch 124 via an electrical line 125 to automatically shut off the drive motor 69 in the event of an unacceptably low pressure differential.

The rotary airlock feeder 1 incorporating the disclosed low pressure purge system 93 exhibits a markedly longer life with much less maintenance than comparable systems. Furthermore, the purge air system 93 employs readily available low pressure convey line air instead of requiring a costly, dedicated high pressure air source. The convey line air supply system 86 can easily be adjusted to supply the additional air flow needed for effective purging of the rotary airlock feeder 1 at very low cost.

While the rotary airlock feeder 1 has been shown and described with four blades 81 for ease of illustration, it should be readily apparent that the number of blades 81 can be any desired number. Furthermore the drive details and the specific arrangement of purge supply lines, Tee connectors, apertures, pressure reduction orifice plate configuration, etc. is exemplary only. Other arrangements may be equally effective. The annular recesses 45 shown machined into the end plates 3 and 4 are optional, and may not be needed if the tolerances between the end plates 3 and 4 and the rotary shrouds 82 are adequate for the purge air flow.

It is to be understood that while certain forms of the present invention have been illustrated and described herein, it is not to be limited to the specific forms or arrangement of parts described and shown.

What is claimed and desired to be secured by Letters Patent is as follows:

1. A combination rotary airlock feeder for introducing material from an unpressurized source to a pressurized pneumatic convey line and a low pressure purge air system, the combination comprising:

(a) said pressurized pneumatic convey line including a first end and a second end, with a material intake positioned between said first and second ends, said material intake being connected to an output of said rotary airlock feeder for receiving the material from said rotary airlock feeder into said pneumatic convey line, and a pressurized air source being connected to said first end of said pneumatic convey line;

(b) pressure reducing means positioned within the pneumatic convey line between said first end and said material intake for causing a pressure drop within said line;

(c) purge air supply means connected to said convey line at a point in said convey line between said first end and said pressure reducing means for feeding pressurized air from said convey line to said rotary airlock feeder;

(d) said rotary airlock feeder comprising:
  (i) a pair of fixed end plates;
  (ii) a rotary shaft;
  (iii) means positioned within said end plates to support respective opposite ends of said shaft;
  (iv) means for rotating said shaft;
  (v) a plurality of blades attached to said shaft for rotation therewith; and
  (vi) a pair of rotary shrouds attached to said shaft, with an inner surface of each shroud abutting a respective opposite end of each said plurality of blades, said rotary shrouds being positioned adjacent respective ones of said end plates with a continuous gap allowing air flow between each of said end plates and the respective rotary shroud; and
  (vii) wherein each of said end plates comprises an inward facing annular recess connected to a respective one of said continuous gaps;

(e) purging means for utilizing the air from said purge air supply means as purge air to purge said rotary airlock feeder, said purging means including a pair of purge air inputs for introducing the purge air from said purge air supply means through said annular recess in each of said end plates, respectively such that said purge air flows continuously around said annular recesses and into said continuous gaps to prevent said material from being introduced from interior portions of said rotary airlock feeder into said continuous gaps;

(f) said purge air supply means comprising:
  (i) a purge air supply line attached to said convey line via a connector;
  (ii) dividing means connected to said purge air supply line to divide the purge air flowing therethrough into two divergent paths; and
  (iii) means for connecting each of said paths to a respective one of said purge air inputs;

(g) differential pressure sensing means for sensing a pressure differential between a high and a low pressure input;

(h) means for connecting said high pressure input into said purging means to sense the pressure therein; and (i) means for connecting said low pressure input into said convey line downstream from said pressure reducing means to sense the pressure therein.

2. A combination rotary airlock feeder and a low pressure purge air system as in claim 1, wherein:
  (a) said pressure reducing means comprises a pressure reduction orifice positioned within said convey line.

3. A combination rotary airlock feeder and a low pressure purge air system as in claim 1, and further comprising:
  (a) indicating means connected to said differential pressure sensing means for indicating when said pressure differential is at an unacceptable level.

4. A combination rotary airlock feeder and a low pressure purge air system as in claim 1, and further comprising:

(a) means connected between said differential pressure sensing means and said means for rotating said shaft for shutting off said shaft rotating means when said pressure differential is at an unacceptable level.

5. A combination rotary airlock feeder and a low pressure purge air system as in claim 1, wherein:
  (a) said means for connecting said high pressure input is connected into at least one of said annular recesses in a respective one of said end plates.

6. A combination rotary airlock feeder for introducing particulate material from an unpressurized source to a pressurized pneumatic convey line and a low pressure purge air system, the combination comprising:
  (a) said pressurized pneumatic convey line including a first end and a second end, with a material intake positioned between said first and second ends, said material intake being connected to an output of said rotary airlock feeder for receiving material from said rotary airlock feeder into said pneumatic convey line, and a pressurized air source being connected to said first end of said pneumatic convey line;
  (b) pressure reducing means positioned within the pneumatic convey line between said first end and said material intake for causing a pressure drop within said line;
  (c) purge air supply means connected to said convey line at a point in said convey line between said first end and said pressure reducing means for feeding pressurized air from said convey line to said rotary airlock feeder;
  (d) purging means for utilizing the air from said purge air supply means as purge air to purge said rotary airlock feeder, said purging means including a pair of purge air inputs for introducing the purge air from said purge air supply means through each of a pair of end plates in said rotary airlock feeder, respectively such that said purge air prevents said particulate material from being introduced from interior portions of said rotary airlock feeder into areas adjacent said end plates;
  (e) differential pressure sensing means for sensing a pressure differential between a high and a low pressure input;
  (f) means for connecting said high pressure input into said purging means to sense the pressure therein; and
  (g) means for connecting said low pressure input into said convey line downstream from said pressure reducing means to sense the pressure therein.

7. A combination rotary airlock feeder and a low pressure purge air system as in claim 6, and further comprising:
  (a) a discharge adaptor connected between said rotary airlock feeder and said convey line; and
  (b) said means for connecting said low pressure input is connected into said discharge adaptor.

8. A combination rotary airlock feeder and a low pressure purge air system as in claim 6, and further comprising:
  (a) indicating means connected to said differential pressure sensing means for indicating when said pressure differential is at an unacceptable level.

9. A rotary airlock feeder and low pressure air purging system comprising:
  (a) a generally cylindrical housing with an input opening for inputting particulate material and an output opening for outputting said particulate material;
  (b) a pair of fixed end plates connected at respective ends of said cylindrical housing, each of said end plates comprising an inward facing annular recess;

(c) a pneumatic convey line connected to said output opening with a pressurized air source connected thereto;

(d) a rotary shaft;

(e) bearing means positioned within said end plates to support respective opposite ends of said shaft;

(f) means for rotating said shaft;

(g) a plurality of blades attached to said shaft for rotation therewith;

(h) a pair of rotary shrouds attached to said shaft, with each shroud abutting a respective opposite end of each of said blades, each said shroud being positioned adjacent a respective one of said fixed end plates with a respective continuous gap extending therebetween allowing air flow between each said end plate and the respective rotary shroud, each said annular recess communicating with the respective continuous gap;

(i) purging means including a pair of purge air inputs for introducing purge air into said rotary feeder, each said purge air input extending into a respective one of said annular recesses such that said purge air flows continuously around said annular recesses and into respective ones of said continuous gaps to prevent said particulate material from being introduced from interior portions of said rotary airlock feeder into said respective ones of said continuous gaps;

(j) pressure reducing means positioned within said convey line;

(k) purge air supply means connected to said convey line upstream from said pressure reducing means;

(l) differential pressure sensing means for sensing a pressure differential between a high and a low pressure input;

(m) means for connecting said high pressure input into said purging means to sense the pressure therein; and (n) means for connecting said low pressure input into said convey line downstream from said pressure reducing means to sense the pressure therein.

10. A rotary airlock feeder and low pressure air purging system as in claim 9, wherein:

(a) said pressure reducing means comprises a pressure reducing orifice positioned within said convey line; and (b) said purge air supply means comprises a supply line connected to said convey line, dividing means connected to said purge air supply line to divide the purge air flowing therethrough into two divergent paths, and means for connecting each of said divergent paths to a respective said purge air input in one of said pair of end plates.

11. A rotary airlock feeder and low pressure air purging system as in claim 9, and further comprising:

(a) indicating means connected to said differential pressure sensing means for indicating when said pressure differential is at an unacceptable level.

* * * * *